United States Patent [19]
Zeski et al.

[11] 3,758,915
[45] Sept. 18, 1973

[54] ROLLER FOR COMBING SHAG RUGS

[76] Inventors: Stephen J. Zeski; Earl J. Carter, both of c/o Swanson Electric Shop, 1009 Broadway, Rockford, Ill.

[22] Filed: Sept. 13, 1971

[21] Appl. No.: 179,794

[52] U.S. Cl. .............................. 15/366, 15/5, 15/91, 15/182, 15/386
[51] Int. Cl. ..................... A47l 9/04, A47b 13/00
[58] Field of Search ..................... 15/179, 181, 182, 15/183, 5, 41, 49 C, 50 C, 141, 198, 200, 386, 366

[56] References Cited
UNITED STATES PATENTS
| | | | |
|---|---|---|---|
| 555,935 | 3/1896 | Dolph | 15/5 |
| 1,153,738 | 9/1915 | Devoorde | 15/200 UX |
| 2,523,319 | 9/1950 | Middlestadt | 15/91 X |
| 2,574,128 | 11/1951 | Skidmore | 15/366 X |
| 3,246,378 | 4/1966 | Beckers | 15/179 UX |

FOREIGN PATENTS OR APPLICATIONS
295,066  8/1928  Great Britain ....................... 15/386

*Primary Examiner*—Peter Feldman
*Attorney*—Wolfe, Hubbard, Leydig, Voit & Osann, Ltd.

[57] ABSTRACT

A roller for a vacuum sweeper includes a plurality of relatively rigid tines which are spaced axially from each other on the roller and are freely pivotable relative to the surface of the roller to be swung outwardly of the roller by centrifugal force as the roller is turned, the tines being whipped through the fibers of a shag rug to comb up the shag.

6 Claims, 4 Drawing Figures

ROLLER FOR COMBING SHAG RUGS

BACKGROUND OF THE INVENTION

The present invention relates to a device for combing up the fibers of a shag rug.

SUMMARY OF THE INVENTION

The general object of the present invention is to provide a new and improved rotatable roller which is effective to comb the shag rug much better, more quickly and with less effort than has been possible heretofore and which, at the same time, avoids shredding or breaking the fibers of the rug.

A further object is to provide a roller having a plurality of finger-like tines rotatable with the roller and mounted on the roller by a unique pivotal connection so that centrifugal force holds the tines suspended outwardly from the roller to comb up the fibers, each tine being free to pivot out of its suspended position and into a slot as the roller rotates so as to avoid catching the tines in the rug and shredding or breaking the fibers. In keeping with this object, arcuate lands are formed between the slots and serve to push the fibers off of the tines as the latter pivot into the slots. The tines and the slots preferably are arranged to enable the tines to swing completely into the slots so as to increase the effectiveness of the lands in pushing the fibers off of the tines.

Another object is to provide a roller which has the foregoing advantages and which is adapted for use in a sweeper so that the shag rug can be swept and combed at the same time.

The invention also resides in the novel construction of the tines and in the unique mounting of the tines on the roller.

These and other objects and advantages of the present invention will become more apparent from the following detailed description when taken in conjunction with the accompanying drawings.

DETAILED DESCRIPTION OF THE PREFERRED EMBODIMENT

Figure 1A:
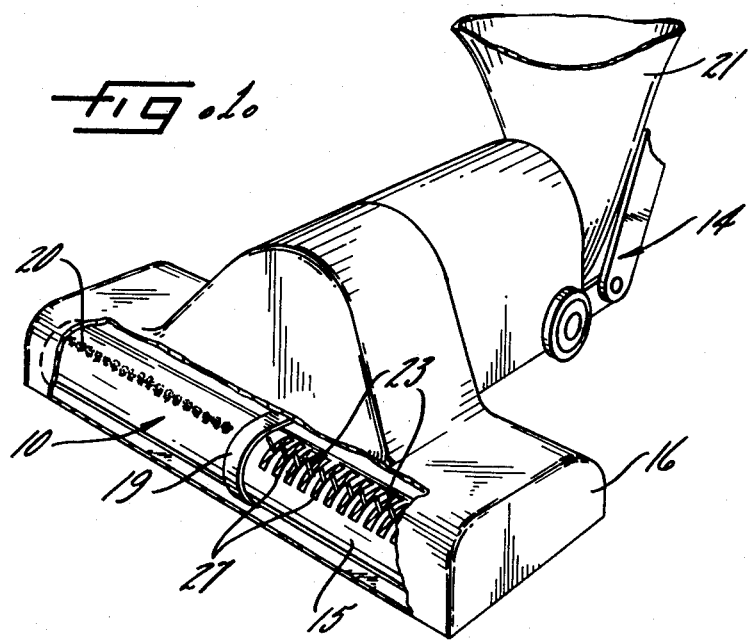
FIG. 1 is a fragmentary perspective view of a vacuum sweeper equipped with a roller embodying the novel features of the present invention, parts of the sweeper being broken away for clarity.

As shown in the drawings for purposes of illustration, the present invention is embodied in a roller 10 for use in combing up the fibers 11 of a shag rug 13. While the description herein relates specifically to the use of the roller in a power-operated vacuum sweeper 14, it will be appreciated that the roller is suited equally well for use in other types of sweepers such as hand-push sweepers. Also, the roller may be employed in an apparatus which is used exclusively for combing the rug.

Figure 2A:
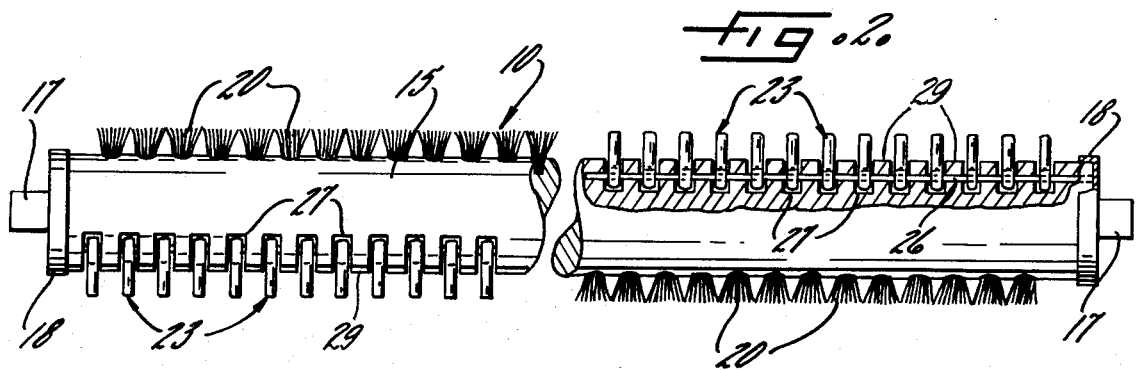
FIG. 2 is an enlarged fragmentary elevational view of the roller shown partially in section.

Herein, the roller 10 comprises a generally cylindrical body 15 and is mounted within the suction housing 16 of the vacuum sweeper 14. The roller is journaled between the inner side walls of the housing by supports in the form of trunnions 17 (FIG. 2) which extend outwardly from caps 18 covering each end of the roller. Power driven means in the form of a drive belt 19 is trained around the central portion of the body and connects with a motor (not shown) which is enclosed within the housing and serves to drive the belt. Brushes 20 extend outwardly from the surface of the body in a generally radial direction to brush across the surface of the rug 13 and sweep up dirt and lint as the roller is rotated. As shown by FIGS. 1 and 2, the brushes are in two circumferentially spaced rows on opposite sides of the roller, one row being located on each side of the belt so that one row extends from the midportion of the roller toward one end thereof while the other row extends from the midportion toward the other end of the body. The two rows alternate in brushing the dirt and lint rearwardly into a passageway (not shown) leading to the collection bag 21 of the sweeper.

When vacuuming the shag rug 13, it is desirable that the fibers 11 of the rug be combed up to enhance the appearance of the rug, to prolong its useful service life and to help the normal action of the vacuum sweeper so that dirt and lint embedded in the fibers can be swept up easily. In accordance with the primary aspect of the present invention, provision is made of a unique roller 10 for use in combing up the individual fibers 11 of the shag rug 13, the roller including a plurality of relatively rigid and substantially straight finger-like tines 23 which are mounted at axially spaced positions from each other by a pivotal connection 24 on the roller. When the roller is rotated, the tines are slung outwardly and suspended from the pivotal connection by centrifugal force and extend lengthwise in a generally radial direction so as to be whipped through the shag to comb up the fibers of the rug. Advantageously, the pivotal connection leaves the tines free to move relative to the roller and to slip out of looped and tightly tangled fibers so that the tines avoid tearing the shag fibers during the combing operation, the fibers being pushed off of the tines in a unique manner. With this novel arrangement, even severely matted and tangled fibers can be combed up to a like-new appearance much more quickly, easily and with substantially fewer torn fibers than has been possible heretofore. Moreover, when the roller is mounted within a sweeper 14 of the type disclosed herein, the rug can be combed and, at the same time, cleaned much better. This is because dirt and lint are loosened from the fibers by the unique combing action of the roller and are swept easily through the combed fibers by the normal action of the sweeper.

Figure 3A:
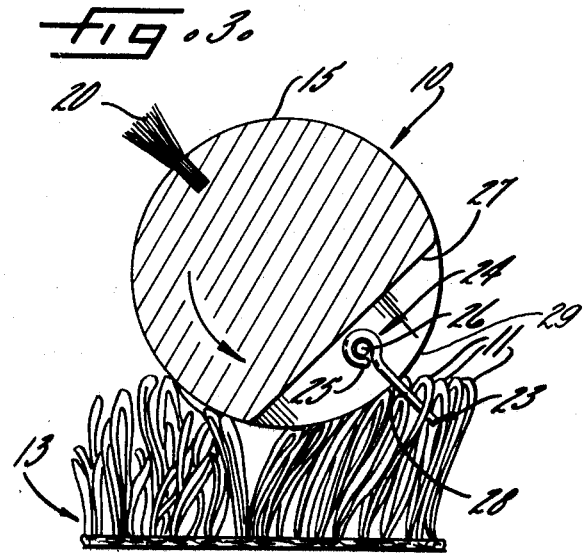
FIG. 3 is an enlarged cross-sectional view taken radially through the roller.
Figure 4A:
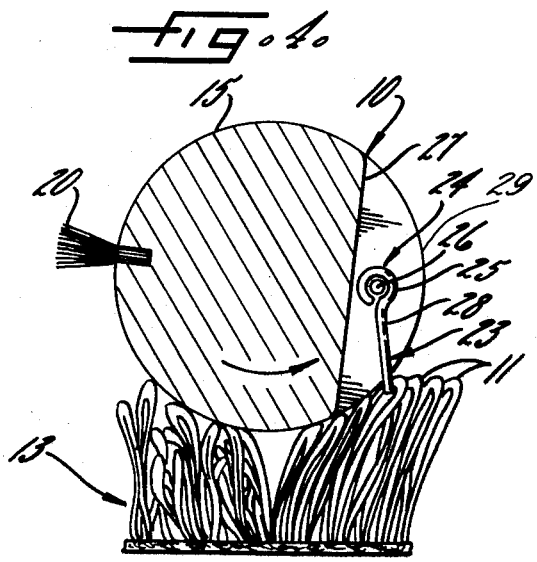
FIG. 4 is a view similar to FIG. 3 but showing the roller turned counterclockwise in a different position.

In the present instance, the tines 23 are arranged in two diametrically spaced rows, each row being spaced diametrically from one of the rows of brushes 20 and extending generally parallel with the central axis of the roller 10 and approximately half way across the body 15. As shown in FIG. 2, one row of tines extends from the midportion of the body toward one end thereof while the other row of tines extends from the midportion toward the other end of the body. More particularly, each tine is a short rod formed of relatively rigid material substantially stiffer than the fibers 11 of the rug 13 so as to comb through the fibers when the roller is rotated. Preferably, the tines are made of metal to reduce wear, but any relatively rigid material would serve equally well, including some plastics. As shown in FIGS. 2 through 4, each tine includes a finger-like shank portion 28 and a looped inner end or eye 25 which is pivotally connected to an elongated rod 26 which is held axially within the body 15 of the roller by one of the end caps 18 and is spaced radially from the central axis of the roller. The looped ends 25 and the associated rod 26 thus constitute the pivot connection 24.

Circumferentially extending notches or slots 27 are cut chordwise across the surface of the roller as shown in FIGS. 3 and 4 and extend to a depth slightly beyond the rod 26. Adjacent slots are separated by arcuate lands 29 (FIGS. 2 to 4) whose outer surfaces are defined by the outer surface of the body 15, the rods 26 extending through the lands. The looped inner end 25 of each tine 23 fits within one of the slots and around the rod 26. Thus, each tine is mounted on the body of the roller and is free to pivot both clockwise and counterclockwise from a lengthwise radially extended combing position as shown in FIGS. 1 and 3. In the combing position, the major length of the shank 28 extends past the end of the slot to comb through the fibers of the rug. When the tines are in their combing positions, the exposed length of the tines is not extremely critical, but it has been found that, when mounted on brush rollers as described herein, tines which extend beyond the surface of the roller a distance approximately equal to the height of the brushes are effective to achieve a highly desirable combing action.

When the sweeper 14 is not in operation, the tines 23 hang loosely within the slots 27 but, when the motor of the sweeper is turned on to drive the belt 19, the tines are slung outwardly (see FIGS. 1, 2 and 3) by the rotating roller and are held suspended radially lengthwise in the combing position by centrifugal force. As the roller rotates, the tines are whipped through the fibers 11 of the shag rug 13 to flip up the fibers thereby to comb the rug. Advantageously, the centrifugal force acting upon the tines is not sufficient to shred or break the fibers and is overcome easily by the strength of the fibers should a tine catch in the fibers such as is shown in FIG. 4. When caught, continued rotation of the body of the roller 14 causes the tine to freely pivot or swing clockwise on the rod 26 as shown in FIG. 4 and to move out of the extended position and into the slot 27 to a release position so that the tine easily slips away from the fibers. Importantly, the lands 29 engage any caught fibers (see FIG. 4) and push or strip the fibers off of the tines as the latter swing inwardly into the slots. Preferably, the tines are of such length and the slots are of such depth as to enable the tines to swing completely into the slots so that the free outer ends of the tines may swing inwardly of the outer periphery of the body as shown in phantom lines in FIG. 4. As a result, the tines may "hide" completely within the slots to insure complete release of the fibers as the lands 29 push the fibers from the tines. Thus, the tines avoid shredding and breaking the fibers of the rug. Furthermore, since each tine is mounted individually on the rod, the centrifugal force acts on each tine individually. Thus, the combing action of any one tine is completely independent of the action of any other tine so that both long and short fibers are combed up equally well. At the same time that the fibers are being combed, the suction of the sweeper helps to pull the fibers up and to draw dirt and lint loosened by the combing action of the tines from between the fibers and through the passageway into the collection bag 21.

In addition to the advantages of the roller 10 in combing up the fibers 11 of the shag rug 13, the tines 23 serve a slightly different function when used on the more conventional short fiber rugs. It will be realized that when sweeping a rug with a vacuum sweeper, the area of the rug immediately adjacent the mouth of the vacuum is lifted slightly off the floor due to the suction of the sweeper. When the vacuum sweeper 14 employing the roller 10 is used to sweep a relatively short fiber rug, the tines 23 serve as a plurality of small fingers which slap against the raised area of rug and, in effect, pound the rug all along the roller and cause vibrations in the rug. The vibrations loosen dirt and lint and bounce the latter up into the air or to the surface of the rug to be swept and pulled into the collection bag 21 by the rotating brushes 20 and the vacuum.

Thus, it will be seen that the present invention provides a new and improved roller 10 for combing a shag rug 13 much more easily than was possible heretofore. Advantageously, the roller can be used to comb the shag rug at the same time that the rug is vacuumed, and the roller is also very useful in cleaning short fiber rugs. Consequently, the sweeper 14 can be used for both shag rugs and regular short fiber rugs without need of changing sweeper attachments.

We claim:

1. A rotatable roller for combing up the fibers of a shag rug while sweeping dirt from the rug, said roller comprising an elongated and generally cylindrical body adapted to be rotated about a horizontal axis, at least one row of slots formed in said body, said slots extending chordwise of said body and being spaced from one another along the axis of said body, an arcuate land located between adjacent ones of said slots, a plurality of relatively rigid tines rotatable with said body, said tines having inner end portions disposed within said slots and having substantially straight and finger-like free outer end portions adapted to comb up the fibers of the rug, a pivot connection mounting the inner end portion of each tine within its respective slot for swinging about a horizontal axis and leaving the tine free to swing outwardly of such slot, said tines being swung outwardly into extended positions by centrifugal force so as to comb through the fibers of said rug when said body is rotated and being individually pivotable about said connection when caught by the fibers so as to enable said free end portions to swing inwardly and to enable said lands to push the fibers off of the tines to prevent tearing of the fibers, and a brush secured to and rotatable with said body and spaced angularly from said tines for sweeping dirt from said rug while the latter is being combed by said tines.

2. A rotatable roller as defined in claim 1 which said slots are of such depth and said tines are of such length to permit the tines to swing completely into said slots with the free outer ends of the tines located inwardly of the outer periphery of said body.

3. A rotatable roller as defined in claim 1 in which said slots are disposed in a straight axially extending row, said pivot connection comprising a straight elongated rod extending through said slots and lands and spaced radially from the rotational axis of said body, and an eye formed on the inner end portion of each tine and pivotally receiving said rod.

4. A rotatable roller as defined in claim 1 further including a second row of slots formed in said body and spaced angularly and axially from said first row, and a series of tines identical to said first tines and pivotally mounted in said second slots in a manner identical to the mounting of said first tines.

5. A rotatable roller for combing up the fibers of a shag rug, said roller comprising an elongated and generally cylindrical body adapted to be rotated about a horizontal axis, at least two angularly spaced rows of slots extending along said body, the slots of each row extending generally chordwise of said body and being spaced from one another along the axis of said body, an arcuate land located between adjacent ones of said slots, a plurality of relatively rigid tines rotatable with said body, said tines having inner end portions disposed within said slots and having substantially straight and finger-like free outer end portions adapted to comb up the fibers of the rug, a pivot connection mounting the inner end portion of each tine within its respective slot for swinging about a horizontal axis and leaving the tine free to swing outwardly of such slot, said tines being swung outwardly into extended positions by centrifugal force so as to comb through the fibers of said rug when said body is rotated and being individually pivotable about said connection when caught by the fibers so as to enable said free end portions to swing inwardly and to enable said lands to push the fibers off of the tines to prevent tearing of the fibers, said slots being of such a depth and said tines being of such a length and so arranged relative to one another as to permit the tines to swing completely into the slots with the free outer ends of the tines located inwardly of the outer periphery of said body.

6. A vacuum sweeper for combing up the fibers of a shag rug while sweeping dirt from the rug, said sweeper having a suction housing, a roller mounted within said housing for rotation about a generally horizontal axis, and power driven means connected to said roller for rotating the latter about said axis, said roller comprising an elongated and generally cylindrical body, first and second circumferentially spaced rows of radially projecting brushes secured to said body and operable to sweep dirt and lint from the rug and into said suction housing as the body is rotated, one of said rows extending from the midportion of said body toward one end thereof and the other of said rows extending from said midportion toward the other end of said body, first and second diametrically spaced and axially extending rows of slots formed in said body, each of said rows of slots being spaced circumferentially from the respective row of brushes, one of said rows of slots extending from the midportion of said body toward one end thereof and the other of said rows of slots extending from said midportion toward the other end of said body, said slots extending chordwise of said body and being spaced axially from one another along said body, a series of arcuate lands spaced axially along said body and located between the slots of said rows, a plurality of relatively rigid tines rotatable with said body, said tines having inner end portions disposed within said slots and having substantially straight and finger-like free outer end portions adapted to comb up the fibers of the rug, and a pivot connection mounting the inner end portion of each tine within its respective slot for swinging about a horizontal axis and leaving the tine free to swing outwardly of such slot, said tines being swung outwardly into extended positions by centrifugal force so as to comb through the fibers of said rug when said body is rotated and being individually pivotable about said connection when caught by the fibers so as to enable said free end portions to swing into said slots and to enable said lands to push the fibers off of the tines to prevent tearing of the fibers, said slots being of such a depth and said tines being of such a length as to permit the tines to swing completely into the slots with the free outer ends of the tines located inwardly of the outer periphery of said body.

* * * * *